Nov. 15, 1949 — L. W. MUELLER ET AL — 2,488,064
SERVICE CLAMP
Filed April 24, 1947 — 2 Sheets-Sheet 1

Inventors
Lucien W. Mueller &
John J. Smith,
Attorneys

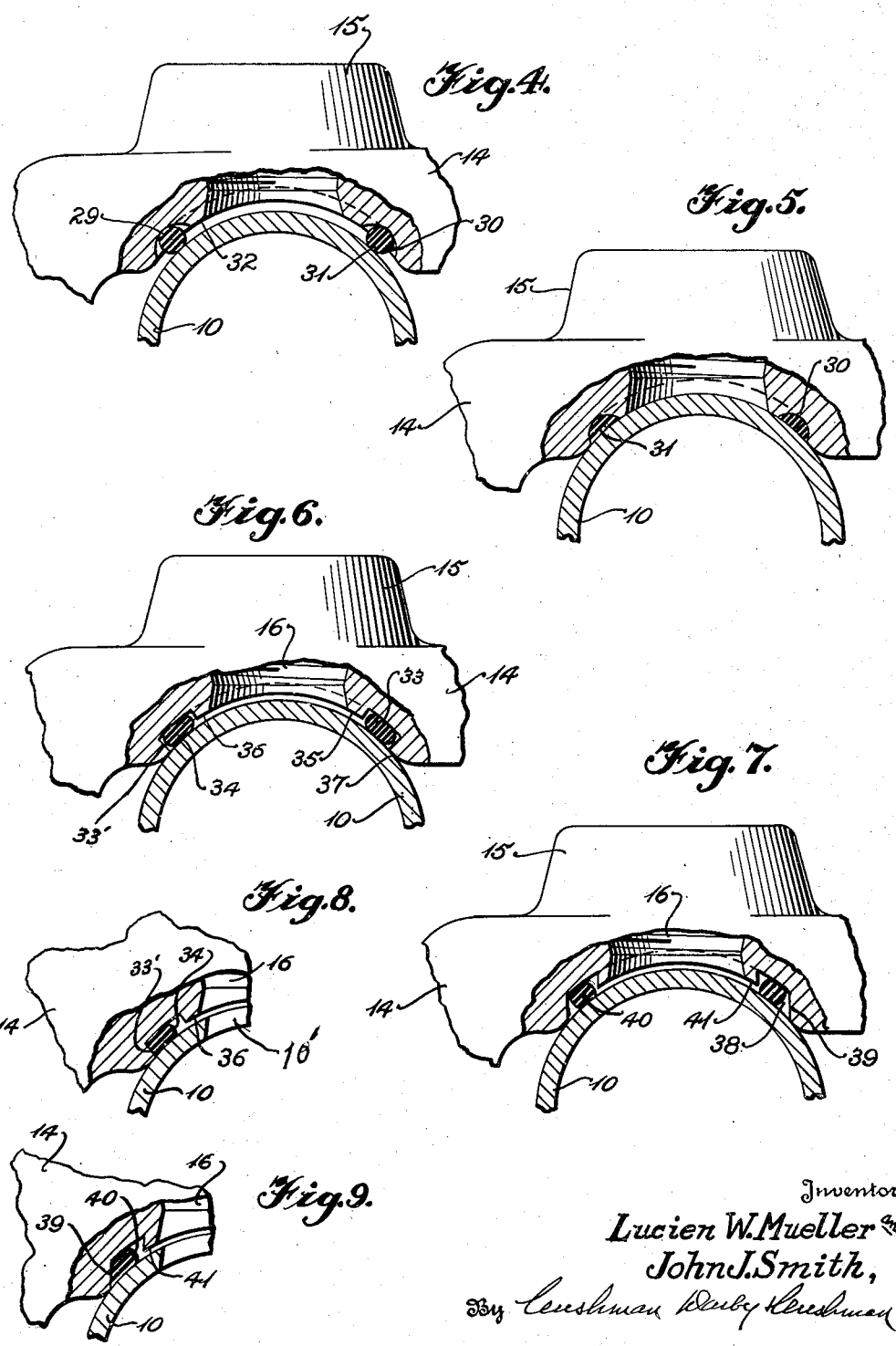

Patented Nov. 15, 1949

2,488,064

UNITED STATES PATENT OFFICE 2,488,064

SERVICE CLAMP

Lucien W. Mueller and John J. Smith, Decatur, Ill., assignors to Mueller Co., Decatur, Ill., a corporation of Illinois Application April 24, 1947, Serial No. 743,694

8 Claims. (Cl. 285—108)

The present invention relates to service clamps and more particularly to an improved two-part clamp structure for connecting a branch pipe or the like to a main.

An important object of the invention consists in providing a service clamp including a pair of co-acting clamping members arranged to be firmly attached to a supply main or pipe to be tapped so as to connect thereto a branch pipe. Each of the clamping members is formed of angular shape and has a transverse or horizontal portion and an integral threaded stud or shank. One of the transverse portions constitutes a top clamp and is provided with a tubular threaded boss that overlaps the main so as to receive a suitable tapping tool and a branch fitting, while the other transverse portion provides a bottom clamp shaped to conform to the curvature of the main. The top and bottom clamping members at their outer ends have openings each of which is arranged to receive the shank of the adjacent member so as to firmly secure the main between the clamping members when the parts are set up. In other words, means are provided associated with a two-piece clamp to insure a powerful gripping action of the clamp on the pipe or main to maintain the parts in a rigid or fixed position.

A further object consists in providing an improved gasket arranged to be interposed between the top clamp member and the main for firmly securing the clamping members in position and for preventing displacement of the parts when the clamp is set up.

Other objects and advantages of the invention will become apparent from the following description when taken in conjunction with the accompanying claims and drawings.

Referring to the drawings which show several preferred embodiments the invention may assume:

Figure 4 is a sectional view of an improved gasket structure arranged to be interposed between the top clamping member and the main when the parts are set up.

Figure 5 is a view similar to Figure 4 showing the clamp applied the the main.

Figure 6 is a sectional view of a further modified form of gasket structure.

Figure 7 is a sectional view of another modified gasket arrangement.

Figure 8 is a fragmentary view showing the sealing effect of the fluid pressure on the form of gasket shown in Figure 6, after an opening has been drilled in the main, and Figure 9 is a similar view of the form shown in Figure 7.

Figure 1:
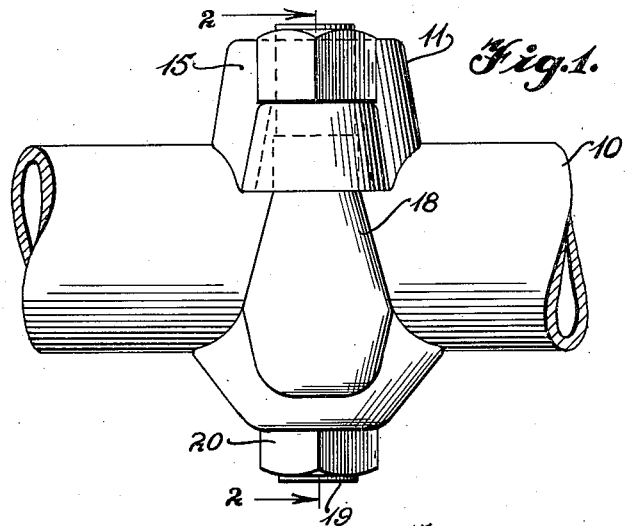
Figure 1 is a side view of a supply main or pipe with the improved service clamp applied thereto.
Figure 2:
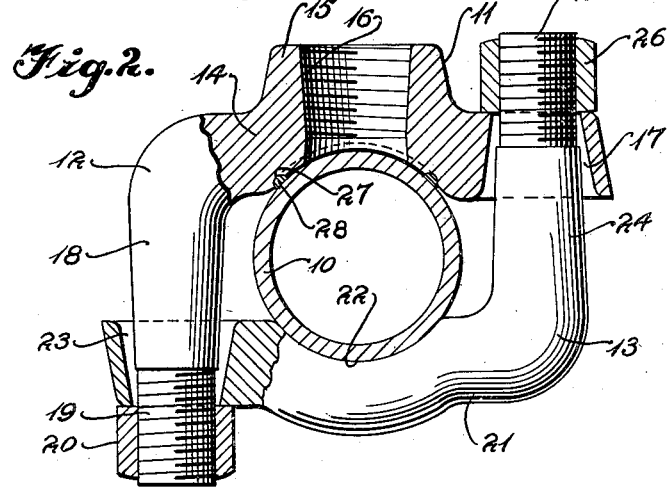
Figure 2 is a sectional view taken substantially along the line 2—2 of Figure 1.
Figure 3:
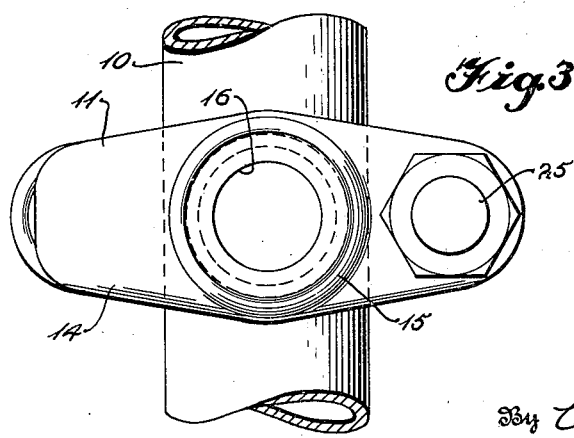
Figure 3 is a plan view of Figure 1.

Referring to the drawings in which like numerals indicate like parts, in the several views, 10 designates a water or gas supply main with which the improved service clamp 11 may be associated for the purpose of connecting a branch pipe or the like thereto at any predetermined point. The service clamp 11 preferably comprises a pair of co-acting clamping members 12 and 13 (Fig. 2) either or both of which may be made of malleable iron or brass. The member 12 is formed with a transverse or horizontal saddle portion 14 preferably of the shape as shown in Figure 3, which is provided with a boss 15 having an internally threaded bore 16 and an upwardly tapered opening 17 in the outer or free end thereof. The clamp 12 has extending downwardly from the boss 15 on the side opposite the opening 17, a rigid stud or shank 18 which preferably tapers downwardly and is provided at its outer end with a threaded portion 19 that is arranged to receive a complementary formed clamping nut 20. The member 13 is similarly provided with a transverse or horizontal portion 21 (Fig. 2) which constitutes a bottom clamp that may be curved as at 22 to conform with the curvature of the pipe 10 with which the clamp is associated. The outer end of the transverse member 21 has a downwardly tapered opening 23 through which loosely extends the threaded stud or shank 18 of the clamping member 12. The clamp 13 is also formed with an integral rigid stud or shank 24 which tapers upwardly and has a threaded end portion 25 which extends loosely through the opening 17 of the clamp 12 and is arranged to be releasably secured thereto by the retaining nut 26.

The bottom of the transverse portion 14 of the clamp 12 adjacent the threaded bore 16 is preferably provided with an annular groove 27 which is arranged to receive any suitable lead or rubber gasket ring, such as 28 to provide a tight seal between the main and the clamp at the point adjacent the connection of the branch pipe to the main.

The service clamp 11 is of such size as to accommodate pipes or mains of varying outside diameters according to the particular use of the main and the size of the branch pipes to be associated therewith. Assuming that it is desired to tap the main 10 in order to connect a branch pipe thereto, the service clamp is applied to the pipe at the desired point so that the boss 15 will align with the point in the main where the opening is to be made. The rigid studs 18 and 24 are then inserted through their complementary openings 23 and 17 respectively in the clamp members 12 and 13 and the nuts 20 and 26 applied so as to tighten the clamp onto the main. It will be noted that the boss 15 straddles the upper surface of the main where the fitting is to be connected while the bottom clamp 21 engages the underside of the main directly opposite the top clamp 12. The studs 18 and 24 extend loosely through their complementary tapered openings so as to allow limited rocking movement of the studs, and these studs are outwardly spaced or offset from the adjacent wall of the main 10 (Fig. 2) in order to accommodate mains of various sizes without contacting the same. An important advantage of the present arrangement is that after the retaining nuts 20 and 26 are sufficiently tightened on the threaded studs 18 and 24 to bring the bottom clamp 21 into engagement with the adjacent surface of the main 10, further tightening of either the nut 20 or 26 will act uniformly on both clamping members and thus prevent the gasket 28 from shifting its position as not infrequently occurs with service clamps held on the main by flexible U-shaped straps that have nuts engaging the top clamp member. During the clamping operation the top or saddle 14 of the clamp 12 is pressed downwardly to force the gasket 28 into firm sealing engagement with the main adjacent the point where the pipe is to be cut and the branch fitting inserted. Each of the studs 18 and 24 preferably tapers outwardly which serves to strengthen the studs and prevent breaking off of the same from the transverse portions when the clamp is tightened up on a main. By providing the studs 18 and 24 of larger diameter adjacent the transverse portions 14 and 21 respectively, each of the clamp members is strengthened or reinforced at the juncture of the stud with the transverse portion so as to lessen or preclude the possibility of bending the clamp members when they are tightened up on the main. The groove 27 may be of V-shape instead of semi-circular, provided it is large enough to completely receive the gasket 28.

In the modified form of the invention shown in Figures 4 and 5 the parts of the clamp are substantially similar to the form previously described with the exception that the bottom 29 of the top clamp 14 is formed with an annular groove 30 in which is preferably positioned an annular O-ring rubber gasket 31, that normally protrudes from the bottom of the clamp 14. The depth and width of the groove 30 relative to the size of the gasket 31 is such that the portion 32 adjacent the groove 30 will be spaced from the main 10 (Fig. 4). As the clamp is applied to the main the gasket 31 which is of smaller diameter than the width of the groove 30, will be spread outwardly or distorted to fill the groove and the portion 32 of the top 14 will be moved into frictional contact with the outer surface of the main 10 on each side of the groove 30 so that the parts assume the position as shown in Figure 5.

It will be observed that the rubber gasket 31 when the clamp is applied to the main is distorted so as to be totally contained within the groove 30 and cannot be blown out. Manifestly, a lead gasket could equally be used and when subjected to downward pressure, the gasket would be distorted so as to fill the groove 30 and thus provide a tight sealing engagement between the parts. In the form of joint shown in Figure 2, the final contact of the top member or saddle 14 with the main 10 is made through the lead gasket 28 and therefore is not quite as rigid as the joint made with the rubber gasket 31 (Fig. 5) in which both the top clamp 12 and the bottom clamp 13 are brought into firm tight sealing engagement with the main 10.

In the modification disclosed in Figure 6, the top 14 of the clamping member 12 is formed with an annular groove 33 on the underside thereof and has radial side walls 33'. The groove 33 receives a rubber O-ring 34 or the like, and the portion of the saddle 14 between the opening 16 and the annular groove 33, is cut away or reduced as at 35 to provide an inside space 36 between the clamp and the main 10 to freely admit fluid pressure from the bore 16 into the groove 33 against the inner side of the gasket 34. The outer portion 37 of the bottom of the member 14 adjacent the groove 33 makes a metal-to-metal contact with the main so that after an opening has been drilled in the main the pressure of the liquid through the space 36 on the gasket 34 acts to force the gasket firmly against the outer side wall 33' of the groove 33 as shown in Figure 8 to further insure the provision of a tight seal. The parts are shown prior to the drilling of the main, but after the final clamping of the members 12 and 13 to the main and the gasket 34 being initially compressed between the bottom of the groove and the main, (Fig. 6) and also after the opening 10' has been formed in the main, (Fig. 8). When the saddle 14 is clamped to the main 10, the groove 33 forms therewith an annular cavity in which is positioned the deformable gasket or packing 33, and the gasket 33 may be equal or of less volume than the annular cavity so that no portion of the gasket or packing will be forced or squeezed out between the main and the clamp. If the cavity is of greater size than the volume of the gasket or packing it will not impair the sealing efficiency of the gasket under force of the fluid pressure passing through the passage 36.

In the modification shown in Figure 7 the annular groove 38 in the underside of the top 14 is formed similar to the groove 33 in Figure 6, but has its side walls 39 disposed substantially parallel to the vertical axis of the main 10 instead of radial. The annular rubber gasket or O-ring 40 is positioned within the groove 38 so that upon the parts being clamped, it will spread to partially fill the groove 38 and be forced into light sealing engagement with the adjacent surface of the main. A reduced passage 41 between the inside of groove 38 and the threaded bore or opening 16 in the boss 15 allows fluid pressure to be forced against the gasket so as to further insure a tight sealing engagement of the gasket when the main has been drilled, as shown in Figure 9. Each of the gaskets 33 and 38 shown in Figures 6 and 7 is normally circular and are shown slightly distorted and in the position they assume prior to the clamp being applied to the main.

The construction and arrangement of the clamping members 12 and 13 when associated with a main or the like provide a strong and rigid two-piece clamp so that when the nuts 20 and 26 are tightened, a powerful gripping action on the pipe or main 10 is produced which is more efficient than the heretofore U-shaped clamp which is open to the objection that such a U-shaped clamp does not quite conform to the contour of the main or pipe to which it is to be connected so that during the tightening up of the clamp on the main any reaction at one nut upon tightening of the other, is transmitted through slipping of the strap or through the smoothing out of irregularities of the strap. Moreover, due to the rough spots on the main the strap has a tendency to stick to a point short of complete take-up. Further, a severe jolt may later cause the strap to slip and break. Not infrequently the strain placed on either side of the strap in tightening up the same causes the top member to slip and displace the gasket from its position in the groove. By reason of the present two-piece clamping structure, the bottom portion 21 of the clamping member 13 as well as the top 14 of the clamping member 12 are made strong and rigid and are fulcrumed on the main 10 so that upon tightening up of either the nut 20 or the nut 26 there is transmitted to each of the clamping members equal reactions from one nut to the other.

The clamping structures shown in Figures 4, 5, 6 and 7 are so constructed and arranged as to be capable of holding a much larger pressure than the gasket 28 (Fig. 2) and may be applied to the ordinary types of service clamps having yieldable straps. When these gaskets are associated with the rigid clamp 11 they provide a strong rigid and positive clamping assembly that makes a more efficient and effective lead joint or a rubber joint construction than can be obtained with a flexible U-shaped strap, due to the greater firmness of contact of the clamps 12 and 13 with the main.

It is to be understood that the forms of the invention shown and described are merely illustrative of preferred embodiments and that such changes may be made as come within the purview of one skilled in the art without departing from the spirit of the invention and the scope of the claims.

We claim:

1. A service clamp for connecting a branch pipe to a main including a pair of co-acting clamping members, each of said members having a transverse portion and an angularly disposed stud, one of the transverse portions constituting a top clamp and the other transverse portion a bottom clamp, said top and bottom clamps arranged to engage opposite sides of the main, each of said top and bottom clamps having an opening therein through which extends the stud of the other clamp, said top clamp having a boss provided with a bore for receiving a tapping fitting, the underside of the clamp having an annular groove, a deformable O-ring gasket in said groove, said gasket being of smaller diameter than the width of the groove so that when the clamp is applied to the main, the gasket is distorted to completely fill the groove, and means connected to the studs for tightening the top and bottom clamps to the main, said top clamp when clamped to the main co-acting with said groove to form an annular cavity sufficiently large to receive the entire deformable gasket so that no portion of the gasket will be forced out between the main and the clamp.

2. A service clamp for connecting a branch pipe to a main including a pair of co-acting clamping members, each of said members having a transverse portion and an angularly disposed stud, one of the transverse portions constituting a top clamp and the other transverse portion a bottom clamp, said top and bottom clamps arranged to engage opposite sides of the main, each of said top and bottom clamps having an opening therein through which extends the stud of the other clamp, said top clamp having a boss provided with a bore for receiving a tapping fitting, the underside of the top clamp adjacent said bore having an annular groove provided with radial sides, an O-ring gasket in said groove, the bottom of the top clamp between the annular groove and said bore being reduced to provide a passage for conducting fluid under pressure from the bore against the inside of the gasket to force the same against the outer side of the groove, and means connected to the studs for tightening the top and bottom clamps to the main.

3. A service clamp for connecting a branch pipe to a main including a pair of co-acting clamping members, each of said members having a transverse portion and an angularly disposed stud, one of the transverse portions constituting a top clamp and the other transverse portion a bottom clamp, said top and bottom clamps arranged to engage opposite sides of the main, each of said top and bottom clamps having an opening therein through which extends the stud of the other clamp, said top clamp having a boss provided with a bore for receiving a tapping fitting, the underside of the top clamp adjacent the bore having an annular groove provided with sides substantially parallel with the axis of the bore, an O-ring gasket in said groove and of smaller diameter than the width of the groove, the bottom of the top clamp between the inner wall of the groove and the bore being reduced to provide a passage for conducting fluid under pressure against the inside of the gasket to force the same against the outer side wall of the groove, and means connected to the studs for tightening the top and bottom clamps to the main.

4. A service clamp for connecting a branch pipe to a main including a pair of co-acting clamping members, each of said members having a transverse portion and an angularly disposed threaded stud, one of the transverse portions constituting a top clamp and the other transverse portion a bottom clamp, said top and bottom clamps arranged to engage opposite sides of the main, each of said studs being tapered outwardly so as to increase the strength of the stud at the juncture of the clamp therewith, each of said top and bottom clamps having a tapered opening through which loosely extend the stud of the other clamp, said top clamp having a boss provided with an internally threaded bore for receiving a tapping fitting, the underside of the top clamp having an annular groove, a gasket in said groove arranged to contact with the main when the parts are set up, and nuts detachably connected to the threaded shanks for securing the clamp firmly in position on the main.

5. A service clamp for connecting a branch pipe to a main including a pair of co-acting clamp members, each of said members having a transverse portion and an angularly disposed stud, one of the transverse portions constituting a top saddle clamp and the other transverse portion a bottom clamp, said top and bottom clamp arranged to engage opposite sides of the main, each of said clamps having an opening through which extends the stud of the other clamp, said studs tapering outwardly from the clamps and having threaded ends, the tapering studs being wider at the juncture of the clamps therewith to increase the strength of the studs at these points, said top clamp having a boss provided with an internally threaded bore for receiving a tapping fitting, the underside of the top clamp having an annular groove adjacent said bore, a gasket in said groove arranged to contact with the main when the parts are set up, and nuts detachably connected to the threaded shanks for securing the clamp firmly in position to the main.

6. In combination with a supply main, a clamp for connecting a branch pipe to the main, said clamp including a saddle member arranged to contact the main, said saddle member having an annular groove, a deformable packing in said groove of smaller diameter than the width of the groove, said packing when the clamp is applied to the main being distorted so as to completely fill the groove and form a tight sealing engagement with the main, said clamp also co-acting with the groove to form an annular cavity sufficiently large to receive the entire deformable packing so that no portion of the packing will be forced out between the main and the clamp.

7. In combination with a supply main, a clamp for connecting a branch pipe to the main, said clamp including a saddle member arranged to contact the main, said saddle member having a boss provided with a bore, the underside of the saddle member adjacent the bore having an annular groove, a deformable O-ring gasket in said groove and of smaller diameter than the width of the groove, said gasket when the clamp is applied to the main being distorted to completely fill the groove to form a tight sealing engagement with the main, said saddle member also co-acting with said groove to form an annular cavity sufficiently large to receive the entire deformable gasket so that no portion of the gasket will be forced out between the main and the saddle member.

8. In combination with a supply main, a clamp for connecting a branch pipe to the main, said clamp including a saddle member arranged to contact the main, said saddle member having a boss provided with a bore, the underside of the saddle member adjacent the bore having an annular groove provided with walls substantially parallel with said bore, an O-shaped gasket in said groove, the bottom of the saddle adjacent the inside of the groove being reduced to provide a passage for communicating said bore with the groove so that when the clamp is set up fluid pressure from the bore enters the groove to force the gasket into tight sealing engagement with the outer wall of the groove and the main.

LUCIEN W. MUELLER.
JOHN J. SMITH.

REFERENCES CITED

The following references are of record in the file of this patent:

UNITED STATES PATENTS

| Number | Name | Date |
|---|---|---|
| 1,641,879 | Brady | Sept. 6, 1927 |
| 1,824,387 | Becker | Sept. 22, 1931 |
| 2,187,217 | Winslow | Jan. 16, 1940 |